United States Patent [19]

Sotomura

[11] Patent Number: 5,190,695
[45] Date of Patent: Mar. 2, 1993

[54] METHODS TO PRODUCE SOLID ELECTROLYTE AND SOLID ELECTRODE COMPOSITES

[75] Inventor: Tadashi Sotomura, Kashiwara, Japan

[73] Assignee: Matsushita Electric Industrial Co., Ltd., Osaka, Japan

[21] Appl. No.: 706,234

[22] Filed: May 28, 1991

[30] Foreign Application Priority Data

| May 28, 1990 | [JP] | Japan | 2-137807 |
| May 28, 1990 | [JP] | Japan | 2-137808 |
| May 28, 1990 | [JP] | Japan | 2-137809 |
| May 28, 1990 | [JP] | Japan | 2-137810 |
| May 28, 1990 | [JP] | Japan | 2-137811 |
| May 28, 1990 | [JP] | Japan | 2-137812 |
| May 28, 1990 | [JP] | Japan | 2-137813 |
| May 28, 1990 | [JP] | Japan | 2-137814 |
| May 28, 1990 | [JP] | Japan | 2-137815 |
| May 28, 1990 | [JP] | Japan | 2-137816 |

[51] Int. Cl.$^5$ .............................................. H01B 1/22
[52] U.S. Cl. .................................. 252/500; 429/191; 429/192
[58] Field of Search ............... 429/191, 192, 189, 198; 252/560, 511

[56] References Cited

U.S. PATENT DOCUMENTS

| 4,810,599 | 3/1989 | Kondo et al. | 429/191 |
| 4,828,945 | 5/1989 | Nagata et al. | 429/191 |
| 5,016,991 | 5/1991 | Mason | 350/357 |

Primary Examiner—Mark L. Bell
Assistant Examiner—Alan Wright
Attorney, Agent, or Firm—Ratner & Prestia

[57] ABSTRACT

This invention relates to methods to produce solid electroyte composites and solid electrode composites employed extensively to fabricate various solid electrochemical devices such as batteries, capacitors, sensors, display devices, recording devices, etc., and also to offer methods to produce solid electrolyte composites of high mechanical strength and large area electrode composites wherein fine powders of said solid electrolyte are uniformly dispersed.

The methods to produce said solid electrolyte composites and solid electrode composites of the invention include a process to produce slurry by dispersing said solid electrolyte powders in a solvent in which plastic resin in dissolved, a process to remove said solvent from said slurry, and a process to add to the solvent one of the compounds selected from (a) to (e): (a) is a catonic surfactant having ethylene-oxide chains and/or propylene-oxide chains; (b) is a cationic surfactant having ethylene-oxide chains and butyleneoxide chains; (c) is a polyether compound produced by adding ethylene-oxide and/or propylene-oxide to a polyamine compound; (d) is a polyether compound produced by adding both ethylene-oxide and butylene-oxide chains to a polyamine compound; and (e) is an amide compound which is a dehydro-condensation product of polyalkyleneimine and fatty acid.

4 Claims, No Drawings

METHODS TO PRODUCE SOLID ELECTROLYTE AND SOLID ELECTRODE COMPOSITES

BACKGROUND OF THE INVENTION

1. Field of Industrial Application

This invention relates to methods to produce solid electrolyte composites and solid electrode composites employed extensively to fabricate solid electrochemical products such as batteries, capacitors, sensors, display devices, recording devices, etc. More specifically, this invention relates to methods to attain uniform solid electrolyte composites and solid electrode composites by adding a specific surfactant to a slurry in which an elastomer is dispersed or dissolved and solid electrolyte powders and/or electrode active material powders are dispersed or dissolved without causing coagulation of said solid electrolyte powders.

2. Prior Arts

It had been known that electrochemical devices, such as compact and thin batteries, electrical double layer capacitors, etc., can be constructed, without leakage of liquid electrolyte, by employing solid electrolyte. However, since such devices employing solid electrolyte lack mechanical elasticity, they are brittle or highly vulnerable against mechanical shocks.

To solve such problems, one method was disclosed in Japanese Laid-Open Patent No. 63-245871 where flexible electrochemical devices resistant to mechanical shocks were fabricated by mixing solid electrolyte powders and/or electrode powders with elastomer such as synthetic rubber; i.e., the electrolyte powders or electrode powders are mixed with an insulating plastic resin to form a practical solid electrolyte composite or electrode composite.

Said solid electrolyte composite or electrode composite made of a plastic resin and solid electrolyte powders or electrode active material powders is produced by dispersing solid electrolyte powders and/or electrode active material powders in plastic resin. That is, these powders are dispersed into a solvent in which plastic resin is dissolved in order to form a slurry firstly; the solvent is removed during or after a molding process involving that slurry.

In these processes, a lipophilic nonpolar solvent such as toluene is employed because solid electrolyte powders are ionic in nature and are slightly dissolved and denatured in a hydrophilic solvent or polar solvent such as water, alcohol, and acetone.

Because solid electrolyte powders are hydrophilic, they are easy to coagulate in a lipophilic solvent to form secondary particles, which unevenly disperse in plastic resin. Moreover, in order to maintain a sufficient ionic conductivity of electrolyte, the amount of plastic resin mixed should be minimized. Thus, it had been very difficult to produce a uniform solid electrolyte with higher mechanical strength, particularly in a product involving large area.

Furthermore, in the production of electrode composites where electrolyte powders and electrode active material powders are mixed with or dispersed in a plastic resin, said solid electrolyte powders form secondary particles. Since these secondary particles are hardly evenly dispersed or admixed in plastic resin, the resultant electrode composite provides a poor ionic conduction when a smaller amount of solid electrolyte powders are admixed in the electrode composite in order to obtain a higher electrode capacity. This resulted in another disadvantage of extremely low electrode utilization.

SUMMARY OF THE INVENTION

The object of present invention is to provide new methods by which are produced uniform solid electrolyte composites and electrode composites having a higher mechanical strength; solid electrolyte powders can be uniformly dispersed therein, and solid electrolyte and electrode composites of larger area can be manufactured.

Said methods of the invention providing solid electrolyte composites and solid electrode composites consist of a process where a slurry is prepared by dispersing solid electrolyte powders into a solvent dissolving a plastic resin, and a process where said solvent is removed from the slurry.

In these processes, one of the compounds selected from (a) to (e) is added to the slurry: (a is an cationic surfactant having either ethylene-oxide chain or propyleneoxide chain, (b) is a cationic surfactant having ethylene-oxide chain and butylene-oxide chain, (c) is a polyether compound derived by adding ethylene-oxide (abbreviated as EO) or propylene-oxide (abbreviated as PO) to a polyamine compound, (d) is a polyether compoundderived by adding EO and butylene oxide (abbreviated as BO) to a polyamine compound, and (e) is an amide compound which is a product of dehydro-condensation of polyalkylene-imine and fatty acid.

Said solid electrolyte composites and solid electrode composites comprising solid electrolyte powders uniformly dispersed in a plastic resin without coagulation of said solid electrolyte powders are produced by adding a specific surface active agent into a solvent in which at least either of said solid electrolyte powders or electrode active material powders and an elastomer are dispersed or dissolved.

Thus, solid electrolyte composites and electrode composites prepared by the above mentioned methods have a uniform ionic conductivity because said solid electrolyte powders and electrode active material powders are uniformly dispersed even in a lipophilic solvent by the effect of the surfactant added. The surfactant also works to provide ion-conductive composites with a higher mechanical strength and good flexibility.

In addition, said electrode active material powders and solid electrolyte powders are evenly mixed and dispersed in said electrode composites so that numerous ionic conductive passages are developed in said electrode composites. Therefore, the electrode composites have both higher electrode utilization and higher mechanical strength with good flexibility.

EMBODIMENTS OF THE INVENTION

An embodiment of methods to produce solid electrolyte composites and electrode composites of the invention is described herein. However, this does not necessarily mean that the present invention is limited within the scope of this embodiment. The part and % and ratio shown in the description of the embodiment mean a weight part, weight %, and a weight ratio unless otherwise specified.

The solid electrolyte powders to be employed in the embodiment of the invention can be chosen from: copper-ion conductive solid electrolyte such as $MCu_4I_{2-x}Cl_{3+x}$ ($x=0.25$–$1.0$, $M=Rb$, $K$, $NH_4$ or a mixture of these), silver-ion conductive solid electrolyte such as CuI-Cu$_2$O- MoO$_3$ glass, RbAg$_4$I$_5$, Ag$_3$Si, AgI-Ag$_2$O -MoO$_3$ glass, and Ag$_6$I$_4$WO$_4$, lithium ion conductive solid electrolyte such as LiI, LiI.H$_2$O, Li-$\beta$-Al$_2$O$_3$, LiI-Li$_2$S-B$_2$S$_3$, and PEO-LiCF$_3$SO$_3$, or proton conductive solid electrolyte such as H$_3$Mo$_{12}$PO$_{40}$.29H$_2$O and H$_3$W$_{12}$PO$_{40}$.29H$_2$O.

Any solid electrolyte powders can be used, which have an average diameter of less than one micron to more than several tens of micron. Even ultra fine particulates having an average diameter less than one micron can be dispersed uniformly according to the present method.

The electrode active materials suitably used in the present invention are solid at room temperature and are selected from simple metals such as metal copper, metal silver, and metal lithium; alloys such as Li-Al and La Ni$_5$; metal sulfides such as copper sulfide, silver sulfide, copper Chevrel phase compound, silver Chevrel phase compound, titanium sulfide, niobium sulfide, and molybdenum sulfide, metal oxides such as manganese dioxide, vanadium oxide, cobalt oxide, and chromium oxide; halides such as silver halide, lead iodide, and carbon fluoride; carbon materials such as activated charcoal, graphite, and carbon black. These are used in a form of powder having an average diameter from less than one micron to several tens of micron.

The plastic resin suitably used in this invention is 1,4-polybutadiene, natural rubber, polyisoprene rubber, styrene-butadiene rubber (SBR), acrylo-nitrile-butadiene rubber (NBR), styrene-butadienestyrene-block-copolymer (SBS), styrene-isoprene-styreneblock-copolymer (SIS), styrene-ethylene/butylene-styrene-block-copolymer (SEBS), butyl rubber, phosphazen rubber, polyethylene, polypropylene, polyethyleneoxide, polystyrene, 1,2 -polybutadiene, or polytetrafluoroethylene.

The dispersing medium or the solvent used to prepare said electrolyte composites or electrode composites is chosen from saturated hydrocarbon, aromatic hydrocarbon, halogenated hydrocarbon, or esters such as n-hexane, n-heptane, n-octane, cyclohexane, benzene, toluene, xylene, ethyl acetate, or trichloroethylene, which hardly react with lipophilic solid electrolyte.

As a cationic surface active agent (or surfactant) having at least one of EO or PO chains, those shown by Formula 1 or 2 can be used.

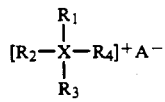  (1)

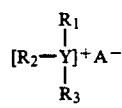  (2)

wherein X is nitrogen or phosphorus, Y is sulfur, A$^-$ is either one of Cl$^-$, Br$^-$, I$^-$, F$^-$, ClO$_4^-$, CH$_3$COO$^-$, CF$_3$SO$_3^-$, OH$^-$, CH$_3$SO$_3^-$, AlCl$_4^-$, BF$_4^-$, PF$_6^-$ and NO$_2^-$, or a combination of these, R$_1$, R$_2$, R$_3$, and R$_4$ are hydrocarbon groups, and at least one of which is a hydrocarbon group of which carbon number is 1 to 30, having or not having a substituent group having either an EO or PO chain, and the rest are hydrocarbon groups of which carbon numbers are 1 to 30, having or not having a substituent group. The desirable additive molar number of EO or PO chains in this case is 1 to 50.

As a cationic surface active agent having EO and BO chains, those shown by Formula 3 or 4 can be used.

  (3)

  (4)

wherein X represents nitrogen or phosphorus, Y represents sulfur, A$^-$ represents either one of Cl$^-$, Br$^-$, I$^-$, F$^-$, ClO$_4^-$, CH$_3$COO$^-$, CF$_3$SO$_3^-$, OH$^-$, CH$_3$SO$_3^-$, AlCl$_4^-$, BF$_4^-$, PF$_6^-$ and NO$_2^-$ or a combination of these, R$_1$, R$_2$, R$_3$, and R$_4$ represent hydrocarbon groups, and at least one of which is a hydrocarbon group of which carbon number is 1 to 30, having or not having a substituent group having EO and PO chains, and the rest are hydrocarbon groups of which carbon numbers are 1 to 30, having or not having a substituent group. The desirable additive molar numbers of EO and PO chain in this case are 1 to 50.

The polyether compound is produced by reacting either EO and/or PO to polyamine compound in the presence of an alkaline catalyst at a temperature of 100° to 180° C. under a pressure of 1 to 10 atm. As a polyamine compound, polyethyleneimine, either one of polyalkylenepolyamine, or its derivative is used.

As a polyalkylene-polyamide, either one of diethylene-triamine, triethylene-tetraamine, hexamethylene-tetraamine, dipropylene-triamine is used. The added molar number of EO and PO is 2 to 150 mols per one active hydrogen atom of polyamine compound. The suitable ratio of added EO over PO, or EO/PO is between 80/20 to 10/90, and the average molecular weight of polyether is between 1000 to one million.

The polyether compound can be obtained by reacting EO and BO to polyamine compound with the aid of alkaline catalyst at 100 to 180° C. and a pressure of 1 to 10 atm. The polyamine compound in this case, can be any of polyethyleneimine, polyalkylene-polyamine or derivatives of these. The polyalkylene-polyamine in this case can be any of diethylene-triamine, triethylenetetraamine, hexamethylene-tetraamine, or dipropylenetriamine.

The added molecular number of EO and BO is 2 to 150 mols per one active hydrogen atom of polyamine compound. The ratio of added EO over BO, or EO/BO is from 80/20 to 10/90, and the average molecular weight of polyether is 1000 to one million.

As a polyalkylamine from which the amide compound is prepared through a dehydrated condensation with fatty acid, any of polyethyleneimine, polypropylene, or polybutyleneimine can be used.

These can be obtained by polymerizing corresponding alkyleneimine in an acid catalyst. Polyalkyleneimine containing 8 to 160 nitrogen atoms per one molecule is suitably used.

As a fatty, any of caprylic acid, palmitic acid, stearic acid, oleic acid, linoleic acid, and recinoleic acid can be used.

The amide compound is produced by dehydration and condensation between polyalkyleneimine and fatty acid in a nitrogen atmosphere at 150° to 200° C. while distilling out water. The mole ratio of polyalkyleneimine to fatty acid is preferably ½ and 1/80.

Said solid electrolyte composites or electrode composites of the invention can be given as follows: plastic resin is dissolved into a lipophilic solvent to make a 1% to 20% solution, then, a surfactant is added to the solution in an amount of 0.1 to 20% with respect to the total weight of the resultant slurry; solid electrolyte powders or both solid electrolyte powders and electrode active material powders are added to the solution; the mixture is pulverized with a ball-mill or disperser to prepare a slurry with 9-95% solid content.

The solid electrolyte or electrode slurry can be prepared by another process where a slurry dispersing solid electrolyte powder or solid electrolyte powder and electrode active material powders in lipophilic solvent which dissolves a surface active agent is mixed with lipophilic solvent dissolving a plastic resin therein.

Said solid electrolyte composites or electrode composites are finally obtained by removing the solvent after the slurry is molded as it is casted or coated on a supporting base of a teflon plate or nylon mesh sheet. In the case of a mesh-like support, said mold can be used as a solid electrolyte composite leaving said mesh support inside. If necessary, the powders of conductive material such as carbon-black can be admixed in the electrode composite besides said solid electrolyte powders and the electrode active material powders.

These processes are carried out in a dry-air atmosphere of which relative humidity (RH) is kept less than 40% RH, suitably in an atmosphere of a dried nitrogen or argon where dew point is made less than minus 20° C.

EXAMPLE 1

Low density polyethylene (Excelene VL-100, density of 0.9, manufactured by Sumitomo Chem. Ind. Co.) acting as an elastomer and a binder is dissolved into toluene to prepare a 15% polyethylene solution.

A cationic surface active agent of which the formula is given by Formula (5) is dissolved in toluene to make a 20% solution. After copper-ion conductive solid electrolyte powders ($RbCu_4I_{1.5}Cl_{3.5}$, density 4.7) having an average particle size of 3 microns are dispersed in said solution to make a solid content of 50%, polyethylene solution is added, and thus a solid electrolyte dispersed liquid (1A) containing 50% solids is prepared. Said copper-ion conductive solid electrolyte powder is prepared by reacting a mixture of RbCl, CuI, and CuCl mixed at predetermined ratios in a sealed glass container at 200° C. for 17 hours.

Then, said cationic surface active agent, said solid electrolyte dispersed liquid (1A), and toluene are mixed at different predetermined ratios, and these mixtures are ground in an alumina ball-mill for 24 hours to obtain slurries of solid electrolyte having different solid contents.

These slurries are individually coated on a smooth teflon plate by using a doctor blade, and are dried in a dried nitrogen atmosphere heated at 80° C. for 5 hours, yielding sheet-formed solid electrolyte composites (1A1-1A3) having a size of 80×80 mm² and a thickness of 110±5 μm containing solid electrolyte for 25, 30, and, 35 volume % respectively.

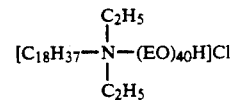

(5)

EXAMPLE 2

By using the same process shown in Example 1, except that the solid electrolyte powder used herein is silver-ion conductive powders ($Ag_6I_4WO_4$) having an average particle diameter of 8 microns and a solid electrolyte dispersing liquid containing a cationic surface active agent expressed by Formula (6) are used, silver-ion conductive solid electrolyte composites (2A1 to 2A3) of a thickness of 96±5 μm containing solid electrolyte for 60, 70 and 80 volume % are prepared.

The $Ag_6I_4WO_4$ powder is prepared by heating a mixture of $Ag_2O$, AgI, and $WO_3$ in air at 400° C. for 6 hours.

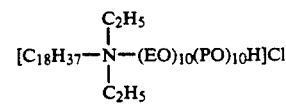

(6)

EXAMPLE 3

By using the same process shown in Example 1, except that the solid electrolyte powder used is lithium-ion conductive powder ($LiI.H_2O$) having an average particle diameter of 5 microns and a solid electrolyte dispersing liquid contained a cationic surface active agent expressed by Formula (7) are used, lithium-ion conductive solid electrolyte composites (3A1 to 3A3) having a thickness of 130±8 μm containing 40, 50 and 60 volume % solid electrolyte are prepared.

The $LiI.H_2O$ powder is prepared by pulverizing its conventionally available powder by using a ball-mill.

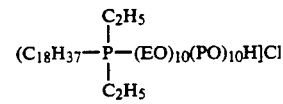

(7)

EXAMPLE 4

By using the same process shown in Example 1, except that a cationic surface active agent expressed by Formula (8) is used instead of that of Formula (5), sheet-formed solid electrolyte composites (4A1 to 4A3) having a thickness of 110±5 μm containing 25, 30 and 35 volume % solid electrolyte are prepared.

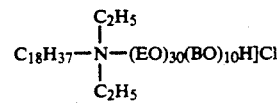

(8)

EXAMPLE 5

By using the same process shown in Example 2, except that a cationic surface active agent expressed by Formula (9) is used instead of that of Formula (6), sheet formed silver-ion conductive solid electrolyte composites (5A1 to 5A3) having a thickness of 96±5 μm containing 60, 70 and 80 volume % solid electrolyte are prepared.

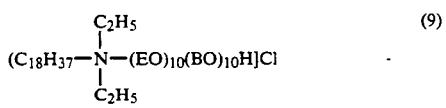

By using the same process shown in Example 3, except that a cationic surface active agent expressed by Formula (10) is used instead that of Formula (7), lithium-ion conductive solid electrolyte composites (6A1 to 6A3) having a thickness of 130±8 μm containing 40, 50 and 60 volume % solid electrolyte are prepared.

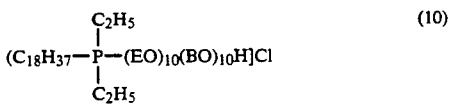

EXAMPLE 7

A low density polyethylene (Excelene VL-200, density=0.9, manufactured by Sumitomo Chem. Ind. Co.) acting as an elastomer and binder is dissolved in toluene to make a 10% polyethylene solution. EO and PO are added to polyethyleneimine containing 10 nitrogen atoms in a molecule at an EO/PO ratio of 30/70 in order to obtain a polyether compound having an average molecular weight of 180,000. This is dissolved into toluene to prepare a 20% polyether solution.

After copper-ion conductive solid electrolyte powder ($RbCu_4I_{1.5}Cl_{3.5}$, density 4.7) having an average particle size of 2 microns is dispersed in said solution containing 50% solids, said polyethylene solution is added, and a solid electrolyte dispersed liquid (7A) containing a solid content of 50% is prepared. Said copper-ion conductive solid electrolyte powder is prepared by reacting a mixture of RbCl, CuI, and CuCl mixed at a predetermined ratio in a sealed glass container at 200° C. for 17 hours.

Then, said cationic surface active agent, said solid electrolyte dispersed liquid (7A), and toluene are mixed at different predetermined ratios, and these mixtures are pulverized in an alumina ball-mill for 24 hours to obtain slurries of solid electrolyte having different solid contents. These slurries are individually coated on a smooth teflon plate by using a doctor blade, and are dried in a dried nitrogen atmosphere heated at 80° C. for 5 hours, yielding sheet-formed solid electrolyte composites (7A1-7A3) having a size of 80×80 mm² and a thickness of 102±5 μm containing said solid electrolyte for 25, 30, and 35 volume % respectively.

EXAMPLE 8

Except that a solid electrolyte dispersed liquid (8A) containing silver-ion conductive solid electrolyte powder of $Ag_6I_4WO_4$ having an average particle size of 8 microns is prepared by dispersing said solid electrolyte in a dispersive liquid containing polyether of which average molecular weight is 65,000 derived by adding EO to triethylenetetraamine, the same processes as shown in Example 7 are employed to obtain silver-ion conductive solid electrolyte composites (8A1 to 8A3) having a thickness of 120±10 μm containing solid electrolyte for 60, 70, and 80 volume % respectively.

Said silver-ion conductive solid electrolyte powder is prepared by reacting a mixture of $Ag_2O$, AgI, and $WO_3$ in air at 400° C. for 6 hours.

EXAMPLE 9

Except that a solid electrolyte dispersed liquid (9A) containing lithium-ion conductive solid electrolyte powder of $LiI_6.H_2O$ having an average particle size of 5 microns is prepared by dispersing the electrolyte in a dispersing liquid containing polyether of which average molecular weight is 65,000 derived by adding EO to triethylene-tetraamine to an EO/PO ratio of 40/60, the same processes as shown in Example 7 are employed to obtain lithum-ion conductive solid electrolyte composites (9A1 to 9A3) having a thickness of 80±5 containing 40, 50, and 60 volume % solid electrolyte respectively.

Said $LiI.H_2O$ powder is obtained by pulverizing the conventionally available $LiI.H_2O$ powder in ethylether by using a ball-mill.

EXAMPLE 10

Except that EO and BO are added to polyethylene-imine containing 10 nitrogen atoms in a molecule at an EO/BO ratio of 30/70 in order to obtain a polyether compound having an average molecular weight 180,000 instead of EO and PO added to polyethylene-imine containing 10 nitrogen atoms per molecule at an EO/PO ratio of 30/70 in order to obtain a polyether compound having an average molecular weight 180,000, the processes shown in Example 7 are used in this case to obtain a sheet-formed solid electrolyte composites (10A1-10A3) having an area of 80×80 band a thickness of 102±5 μm containing 25, 30, and 35 volume % solid electrolyte respectively are prepared.

EXAMPLE 11

Except that polyether having an average molecular weight 8,000 obtained by adding BO and EO to triethylenetetraamine for a BO/EO weight ratio of 20/80 instead of polyether having an average molecular weight of 65,000 obtained by adding EO to triethylenetetraamine, the processes shown in Example 8 are used to obtain sheet formed silver ion-conductive solid electrolyte composites (11A1-11A3) having a thickness of 120±10 μm containing 60, 70, and 80 volume % solid electrolyte respectively.

EXAMPLE 12

Except that polyether having an average molecular weight of 15,000 obtained by adding BO and EO to hexamethylene-tetraamine for a BO/EO weight ratio of 40/60 instead of polyether having an average molecular weight of 15,000 obtained by adding EO and PO to hexamethylene-tetraamine for an EO/PO ratio of 40/60, the processes shown in Example 9 are used to obtain sheet formed lithium-ion conductive solid electrolyte composites (12A1-12A3) having a thickness of 80±5 μm containing 40, 50 and 60 volume % solid electrolyte respectively.

EXAMPLE 13

Except that an amide compound obtained by condensing polyethylene-imine containing 120 nitrogen atoms per molecule and oleic acid at a mole ratio of 1/20 are used instead of using a cationic surface active agent expressed by Formula (5), the process shown in Example 1 is used to obtain sheet-formed solid electrolyte composites (13A1 to 13A3) having an area size of 80×80 mm² and a thickness of 100±5 μm containing 25, 30, and 35 volume % solid electrolyte respectively.

EXAMPLE 14

Except that an amide compound obtained by condensing polyethylene-imine containing 56 nitrogen atoms per molecule and caprylic acid at a mole ratio of 1/8 are used instead of using a cationic surface active agent expressed by Formula (6), the process shown in Example 2 is used to obtain sheet-formed silver-ion conductive solid electrolyte composites (14A1 to 14A3) having a thickness of $95\pm5$ $\mu$m containing 60, 70, and 80 volume % solid electrolyte respectively.

EXAMPLE 15

Except that an amide compound obtained by condensing polypropyleneimine containing 40 nitrogen atoms per molecule and oleic acid at a mole ratio of 1/10 are used instead of a cationic surface active agent expressed by Formula (7), the process shown in Example 3 is used to obtain sheet-formed lithium ion conductive solid electrolyte composites (15A1 to 15A3) having a thickness of $120\pm8$ $\mu$m containing 40, 50, and 60 volume solid electrolyte respectively.

COMPARATIVE EXAMPLE 1

Except a solid electrolyte dispersed liquid (1B) containing no cationic surface active agent is used instead of using said solid electrolyte dispersion liquid (1A), the process shown in Example 1 is used to obtain sheet-formed solid electrolyte composites (1B1 to 1B3) containing 25, 30, and 35 volume % solid electrolyte respectively.

COMPARATIVE EXAMPLE 2

Except that a solid electrolyte dispersed liquid (2B) containing no cationic surface active agent is used instead of said solid electrolyte dispersion liquid (2A), the process shown in Example 2 is used to obtain sheet-formed solid electrolyte composites (2B1 to 2B3) containing 60, 70, and 80 volume % solid electrolyte respectively.

COMPARATIVE EXAMPLE 3

Except that a solid electrolyte dispersed liquid (3B) containing no cationic surface active agent is used instead of said solid electrolyte dispersion liquid (3A), the process shown in Example 3 is used to obtain sheet-formed solid electrolyte composites (3B1 to 3B3) containing 40, 50, and 60 volume % solid electrolyte respectively.

COMPARATIVE EXAMPLE 4

Except that a solid electrolyte dispersed liquid (7B) containing no polyether is used instead of said solid electrolyte dispersion liquid (7A), the process shown in Example 7 is used to obtain sheet-formed solid electrolyte composites (7B1 to 7B3) containing 25, 30, and 35 volume % solid electrolyte respectively.

COMPARATIVE EXAMPLE 5

Except that a solid electrolyte dispersed liquid (8B) containing no polyether is used instead of said solid electrolyte dispersion (8A), the process shown in Example 8 is used to obtain sheet-formed solid electrolyte composites (8B1 to 8B3) containing 60, 70, and 80 volume % solid electrolyte respectively.

COMPARATIVE EXAMPLE 6

Except that a solid electrolyte dispersed liquid (9B) containing no polyether is used instead of said solid electrolyte dispersion liquid (9A), the process shown in Example 9 is used to obtain sheet-formed solid electrolyte composites (9B1 to 9B3) containing 40, 50, and 60 volume % solid electrolyte respectively.

COMPARATIVE EXAMPLE 7

Except that a solid electrolyte dispersed liquid (13B) containing no amide compound is used instead of said solid electrolyte dispersion liquid (13A), the process shown in Example 13 is used to obtain sheet-formed solid electrolyte composites (13B1 to 13B3) containing 25, 30, and 35 volume % solid electrolyte respectively.

COMPARATIVE EXAMPLE 8

Except that a solid electrolyte dispersed liquid (14B) containing no amide compound is used instead of said solid electrolyte dispersion liquid (14A), the process shown in Example 14 is used to obtain sheet-formed solid electrolyte composites (14B1 to 14B3) containing 60, 70, and 80 volume % solid electrolyte respectively.

COMPARATIVE EXAMPLE 9

Except that a solid electrolyte dispersed liquid (15B) containing no amide compound is used instead of said solid electrolyte dispersion liquid (15A), the process shown in Example 15 is used to obtain sheet-formed solid electrolyte composites (15B1 to 15B3) containing 40, 50, and 60 volume % solid electrolyte respectively.

CONDUCTIVITY AND MECHANICAL STRENGTH OF SOLID ELECTROLYTE COMPOSITES

The uniformity of solid electrolyte composites are evaluated by conducting the following experiments.

Those solid electrolyte composites of Examples 1 to 15 and Comparative Examples 1 to 9 are punched out into twenty each 10 mm diameter disks. This disk is sandwiched between two platinum disks, and a pressure of 50 kg is applied thereto. Then, maintaining said applied pressure, the disk is subjected to a heat treatment of 130° C. in nitrogen gas ambient for three hours. The AC resistance of each disk is measured by applying a 10 KHz, 100 mV AC signal on said platinum disks. The average resistances and standard deviations of these solid electrolyte composites are tabulated in Table 1.

The relative flexural strengths of the examples tabulated in Table 2 are expressed by referring to the corresponding values of comparative examples containing no surface active agent which are expressed as 100. The flexural strength is evaluated by a required number of bending along a 50 mm radius curve at a rate of two times a second to bring a 40 mm long and 5 mm wide sample into breakage. The flexural strengths of comparative examples which contain no surface active agent are referred to as 100.

As shown in Tables 1 and 2, the standard deviations of electrical resistances of solid electrolyte composites of the invention are substantially less than those of comparative examples, proving substantially improved uniformities of those. These also show average electrical resistances of composites of the invention substantially less than those of comparative examples which contain no surface active agent.

Furthermore, the solid electrolyte composites of the invention give mechanical strengths higher than those of comparative examples.

EXAMPLE 16

Low density polyethylene (Excelene VL-200, density of 0.9, manufactured by Sumitomo Chem. Ind. Co.) acting as an elastomer and binder is dissolved into toluene to prepare a 10% polyethylene solution.

A cationic surface active agent expressed by Formula (5) is dissolved in toluene to make its 20% solution. After a two-to-one mixture of copper-ion conductive solid electrolyte powder ($RbCu_4I_{1.5}Cl_{3.5}$, density 4.7) having an average particle size of one micron and copper Chevrel phase compound ($Cu_2Mo_6S_{7.8}$, density 4.7) having an average particle size of 0.8 micron is dispersed in said cation surface active agent solution to make a solid content of 50%, polyethylene solution is added, and an electrode powder dispersion (1C) with a solid content of 50% dispersing solid electrolyte powders and electrode active material powders is prepared. Said copper-ion conductive solid electrolyte powder is prepared by reacting a mixture of RbCl, CuI, and CuCl in a sealed glass container kept at 200° C. for 17 hours. The copper Chevrel phase compound is obtained by reacting a mixture of $MoS_2$, Cu, and S at 1000° C. in vacuum for 48 hours.

Then, said cationic surface active agent solution, said solid electrolyte powder dispersed liquid (1C), and toluene are mixed at a predetermined ratio, and this mixture is pulverized by alumina ball-mill for 24 hours to obtain electrode powder slurry. This slurry is coated on a smooth teflon plate by using a doctor knife, and is dried in a dried nitrogen atmosphere heated at 80° C. for 5 hours, yielding a sheet formed solid electrode composite (1C1) having a size of $80 \times 80$ mm$^2$ and a thickness of $154 \pm 5$ μm containing 85 volume % solid electrolyte.

EXAMPLE 17

In this case, the process shown in Example 16 is used to obtain a $125 \pm 10$ μm thick solid electrode composite (2C1) with a solid content of 90 volume %, except a mixture of silver-ion conductive $Ag_6I_4WO_4$ powder having an average particle diameter of 8 microns and vanadic acid powder ($Ag_{0.7}V_2O_5$) at a ratio of 3/2, and the electrode powder dispersion liquid (2C) containing a cationic surface active agent expressed by Formula (6) are used. The $Ag_6I_4WO_4$ material in this case is obtained by reacting a mixture of $Ag_2O$, AgI, and $WO_3$ at 400° C. in air for 6 hours, and said $Ag_{0.7}V_2O_5$ material is prepared by reacting a mixture of Ag and $V_2O_5$ powder at 550° C. in a sealed tube for 6 hours.

EXAMPLE 18

In this case, the process shown in Example 16 is used to obtain an $85 \pm 5$ μm thick solid electrode composite (3C1) with a solid content of 90 volume %, except a mixture of lithium-ion conductive $LiI.H_2O$ powder having an average particle diameter of 5 microns and niobium sulfide powder ($NbS_2$) at a ratio of 1/1, and the electrode powder dispersion liquid (3C) containing a cationic surface active agent expressed by Formula (7) are used. The $LiI.H_2O$ and $NbS_2$ powder are obtained, by pulverizing respective conventional agent in ethyl alcohol with a ball-mill.

EXAMPLE 19

The process employed for Example 16 is used to obtain a $154 \pm 5$ μm thick solid electrode composite (4C1) with a solid content of 85 volume %, except that a cationic surface active agent expressed by Formula (8) is used.

EXAMPLE 20

The process employed for Example 17 is used to obtain a $125 \pm 10$ μm thick and $80 \times 80$ mm$^2$ solid electrode composite (5C1) with a solid content of 90 volume %, except that a cationic surface active agent expressed by Formula (8) is used.

EXAMPLE 21

The process employed for Example 18 is used to obtain a $85 \pm 5$ μm thick and $80 \times 80$ mm$^2$ solid electrode composite (6C1) with a solid content of 90 volume %, except that a cationic surface active agent expressed by Formula (8) is used.

EXAMPLE 22

The process employed for Example 16 is used to obtain a $154 \pm 10$ μm thick and $80 \times 80$ mm$^2$ sheet-formed solid electrode composite (7C1) with a solid of 85 volume % except a polyether compound having an average molecular weight of 180,000 is used instead of the cationic surface active agent. Said polyether compound is derived by adding EO and PO to polyethyleneimine containing 10 nitrogen atoms per molecule at an EO/PO ratio of 30/70.

EXAMPLE 23

The process employed for Example 17 is used to obtain a $125 \pm 10$ μm thick sheet-formed solid electrode composite (8C1) with a solid content of 90 volume %, except that a polyether compound having an average molecular weight of 65,000 is used instead of a cationic surface active agent. Said polyether compound is derived by adding EO to polyethylenetetraamine.

EXAMPLE 24

The process employed for Example 18 is used to obtain an $85 \pm 5$ μm thick sheet-formed solid electrode composite (9C1) with a solid content of 90 volume %, except that a polyether compound having an average molecular weight of 15,000 is used instead of the cationic surface active agent. Said polyether compound is derived by adding EO and PO to hexamethylenetetraamine at an EO/PO ratio of 40/60.

EXAMPLE 25

The process employed for Example 16 is used to obtain a $154 \pm 5$ μm thick $80 \times 80$ mm$^2$ sheet-formed solid electrode composite (10C1) with a solid content of 85 volume % except that a polyether compound having an average molecular weight of 180,000 is used instead of the cationic surface active agent. Said polyether compound is derived by adding EO and BO to polyethyleneimine at in EO/BO ratio of 30/70.

EXAMPLE 26

The process employed for Example 17 is used to obtain a $125 \pm 10$ μm thick sheet-formed solid electrode composite (1C1) with a solid content of 90 volume %, except a polyether compound having an average molecular weight of 8,000 is used instead of the cationic surface active agent. Said polyether compound is derived by adding EO and BO to triethylenetetraamine at an EO/BO weight ratio of 80/20.

EXAMPLE 27

The process employed for Example 18 is used to obtain an 85±5 μm thick sheet-formed solid electrode composite (12C1) with a solid content of 90 volume %, except that a polyether compound having an average molecular weight of 15,000 is used instead of the cationic surface active agent. Said polyether compound is derived by adding EO and BO to hexamethylenetetraamine at an EO/BO ratio of 40/60.

EXAMPLE 28

The process employed for Example 16 is used to obtain an 152±5 thick 80×80 mm² sheet-formed solid electrode composite (13C1) with a solid content of 85 volume %, except that an amide compound obtained by condensing polyethyleneimine containing 120 nitrogen atoms per-molecule and oleic acid at a mole ratio of 1/20.

EXAMPLE 29

The process employed for Example 17 is used to obtain a 120±5 μm thick 80×80 mm² sheet-formed solid electrode composite (14C1) with a solid content of 90 volume %, except that an amide compound obtained by condensing polyethyleneimine containing 56 nitrogen atoms per molecule and capric acid at a mole ratio of 1/8.

EXAMPLE 30

The process employed for Example 18 is used to obtain an 85±5 μm thick solid electrode composite (15C1) with a solid content of 90 volume % except that an amide compound obtained by condensing polypropyleneimine containing 40 nitrogen atoms per molecule and oleic acid at a mole ratio of 1/10.

COMPARATIVE EXAMPLE 10

The process employed for Example 16 is used to obtain a sheet-formed solid electrode composite (1D1) with a solid content of 85 volume % except that an electrode powder dispersion liquid (ID) containing no cationic surface active agent is used instead of an electrode powder dispersion liquid (1C).

COMPARATIVE EXAMPLE 11

The process employed for Example 17 is used to obtain a sheet-formed solid electrode composite (2D1) with a solid content of 90 volume %, except that an electrode powder dispersion liquid (2D) containing no cationic surface active agent is used instead of the electrode powder dispersion liquid (2C).

COMPARATIVE EXAMPLE 12

The process employed for Example 18 is used to obtain a sheet-formed solid electrode composite (3D1) with a solid content of 90 volume %, except that an electrode powder dispersion liquid (3D) containing no cationic surfaced active agent is used instead of the electrode powder dispersion liquid (3C).

EVALUATION OF ELECTRODE COMPOSITES

The characteristics of solid electrode composites of Examples 16, 19, 22, 25, 28, and Comparative Example 10 are evaluated by conducting the following experiments.

These solid electrolyte composites are punched out into twenty each 10 mm diameter disks for evaluation. These disks are placed in a manner that a solid electrolyte pellet is sandwiched between them and that the assembly is further sandwiched between two platinum electrodes; the whole assembly is pressed at 50 kg; then it is subjected to heat treatment at 130° C. in nitrogen gas atmosphere over 3 hours. The solid electrolyte pellet is prepared by molding of one gram of $RbCu_4I_{1.5}Cl_{3.5}$ powder into a 10 diameter disk by applying a pressure of 200 kg/cm². The cells for evaluation, 1C2, 4C2, 7C2, 10C2, 13C2, and 1D2 (for comparative evaluation) are thus assembled by using this process.

As for the electrode composites of Examples 17, 20, 23, 26, and 29 and Comparative Example 11, cells for testing, i.e., 2C2, 5C2, 8C2, 11C2, 14C2, and 2D2 (for comparative evaluation) are likewise prepared by using $Ag_6I_4WO_4$ electrolyte powder.

As for the electrode composites of Examples 18, 21, 24, 27, and 30 and Comparative Example 12, cells for testing, i.e., 3C2, 6C2, 9C2, 12C2, 15C2, and 3D2 (for comparative evaluation), are likewise prepared by using the $LiI \cdot H_2O$ electrolyte powder and a 10 mm diameter and 0.3 mm thick negative electrode disk made of lithium. Ten each 3C2, 6C2, 9C2, 12C2, 15C2, and 3D2 (for comparative evaluation) cells are assembled by a pressure application only without heat application.

The 1C2, 4C2, 7C2, 10C2, 13C2, and 1D2 cells are then charged at a constant voltage of 0.6 volt for 17 hours, and these are discharged for 10 seconds at a constant current of 1 mA, and the voltage differences between right before and after the discharge are measured to obtain the respective polarization voltage. This measurement is conducted for ten cells to obtain their average and standard deviation. The discharge capacity is determined also by discharging the cell down to 0.3 volt at a constant discharge current, and utilization of electrode active material against the theoretically determined capacity is derived.

The 2C2, 5C2, 8C2, 11C2, 14C2, and 2D2 cells are charged at a constant voltage of 0.5 volt for 17 hours, and are discharged for 10 seconds at a constant current of 200 μm in order to derive the respective average and standard deviation of the polarization voltage. The utilitization of electrode active material against the theoretically determined capacity (100 %) is derived by discharging these down to 0.3 volt at a constant current.

The 3C2, 6C2, 9C2, 12C2, 15C2, and 3D2 cells are discharged at a constant current of 50 μA for 10 seconds in order to derive the respective average and standard deviation of these polarization voltages. The utilitization of electrode active material against the theoretically determined capacity (100%) is derived by discharging these down to 1.0 volt at a constant current. The determined polarization voltages and the utilitization are tabulated in Table 3 and Table 4 respectively.

The flexural strength is evaluated as follows: a 40 mm long, 5 mm wide solid electrode composite strip is bent along a curved surface with 50 mm radius at a rate of two bends per second; the number of bends at which the strip is broken is recorded as the flexural strength. Table 5 shows the results.

The relative flexural strengths of these examples are expressed by referring to the corresponding values of comparative examples containing no surface active agent which are expressed as 100.

As shown in Tables 3 to 5, electrodes using electrode composites of this invention are substantially higher than those of comparative examples, and the standard deviations of polarization are less than those of the comparative examples, proving substantially improved uniformities of electrode active material and solid electrolyte material, and low average values of polarization also.

The results also show substantially higher mechanical strengths of the composites of the invention over those of the comparative examples which contain no surface active agent.

EFFECTS OF THE INVENTION

As demonstrated by the embodiments described above, the present invention provides a solid electrolyte slurry and an electrode slurry which are quite stable on standing by an outstanding action of specific surfactant. These slurries are solidified by removing the corresponding solvent to obtain solid electrolyte composites and electrode composites with higher mechanical strength. Furthermore, solid electrolyte composites of lower electrical resistivity and electrode composites of smaller polarization can be obtained.

What is claimed is:

1. A method for making a solid electrolyte composite comprising: dispersing solid electrolyte powders in a solvent in which plastic resin is dissolved to form a slurry; and, removing said solvent from said slurry, wherein from 0.1 to 20 percent based upon the total weight of the resultant slurry of a compound selected from the group consisting of (a) to (e) is included in said slurry:
   (a) a cationic surfactant having both or either of ethylene-oxide chains or propylene-oxide chains containing 1 to 50 ethylene-oxide or propylene-oxide units per one mol of said cationic surfactant;
   (b) a cationic surfactant having ethylene-oxide chains and butylene-oxide chains containing 1 to 50 ethylene oxide or butylene-oxide unit per one mol of said cationic surfactant;
   (c) a polyether compound produced by adding both or either of ethylene-oxide and propylene-oxide to a polyamine compound in an amount of 2 to 150 moles per one active hydrogen atom of said polyamine compound;
   (d) a polyether compound produced by adding both ethylene-oxide and butylene-oxide to a polyamine compound in an amount of 2 to 150 moles per one active hydrogen atom of the polyamine compound;
   (e) an amide compound produced by dehydration and condensation reaction between polyalkylene-imine and fatty acid which contains 8 to 160 nitrogen atoms per one molecule, wherein the polyalkyleneimine to fatty acid mol ratio is ½ to 1/80.

2. A method for making an electrode composite comprising:
   preparing a slurry containing solid electrolyte powders and electrode active material powders by dispersing at least said solid electrolyte powders and electrode active material powders in a solvent dissolving a plastic resin; and,
   removing said solvent from said slurry, wherein from 0.1 to 20 percent based upon the total weight of the resultant slurry of a compound selected from the group consisting of (a) to (e) is included in said slurry:
   (a) a cationic surfactant having both or either of ethylene-oxide chains or propylene-oxide chains containing 1 to 50 ethylene-oxide or propylene-oxide units per one mol of said cationic surfactant;
   (b) a cationic surfactant having ethylene-oxide chains and butylene-oxide chains containing 1 to 50 ethylene oxide or butylene-oxide unit per one mol of said cationic surfactant;
   (c) a polyether compound produced by adding both or either of ethylene-oxide and propylene-oxide to a polyamine compound in an amount of 2 to 150 moles per one active hydrogen atom of said polyamine compound;
   (d) a polyether compound produced by adding both ethylene-oxide and butylene-oxide to a polyamine compound in an amount of 2 to 150 moles per one active hydrogen atom of the polyamine compound;
   (e) an amide compound produced by dehydration and condensation reaction between polyalkylene-imine and fatty acid which contains 8 to 160 nitrogen atoms per one molecule, wherein the polyalkyleneimine to fatty acid mol ratio is ½ to 1/80.

3. The method of claim 1, wherein said solvent is non-polar.

4. The method of claim 2, wherein said solvent is non-polar.

* * * * *